Feb. 27, 1968  J. D. GUILIE  3,370,685
DIVERTER UNIT FOR ROLLER CONVEYOR
Filed Feb. 9, 1967

INVENTOR.
JOE D. GUILIE

BY
ATTORNEYS

INVENTOR.
JOE D. GUILIE 3,370,685
DIVERTER UNIT FOR ROLLER CONVEYOR
Joe D. Guilie, Sunnyvale, Calif., assignor to Score Industries, a corporation of California
Filed Feb. 9, 1967, Ser. No. 614,864
6 Claims. (Cl. 193—36)

ABSTRACT OF THE DISCLOSURE

A diverter unit for roller conveyors wherein the rollers are held on a carrier with the axes of the rollers skewed with respect to the carriers. By rotating the carrier, articles on the conveyor can be diverted to a side path.

Background of the invention

*Field of the invention.*—A diverter unit for roller conveyors wherein cases or bags pass over a series of rollers by gravity.

*Description of prior art.*—No up to date search has been made but it is believed that devices heretofore known have employed complicated switching wherein the shaft carrying the rollers had to be mechanically turned with respect to the direction of travel of articles being conveyed.

Summary of the invention

A diverter for roller conveyors wherein skewed wheels are used on a carrier with means for rotating the carrier through a limited angle, causing the articles to pass either straight ahead or at an angle from the main conveyor path.

Description of the preferred embodiments

Figure 1:
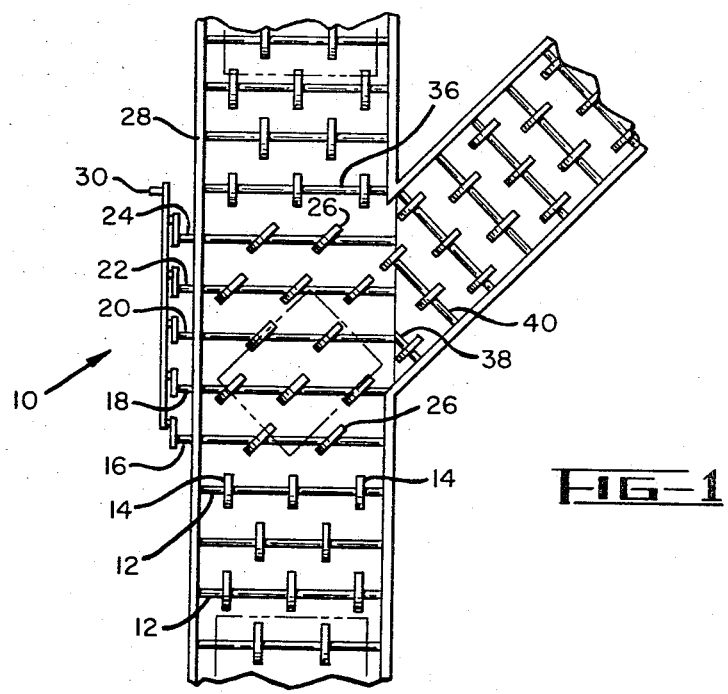
FIGURE 1 is a plan view of a conveyor embodying the present invention.

Referrring to the drawings by reference characters and particularly to FIGURES 1 through 4, there is shown a conveyor generally designated 10 having a plurality of shafts 12 carrying rollers 14. This type of conveyor is very well known and comprises a plurality of small wheels or rollers similar to the ones that are employed on roller skates. Such conveyors are ordinarily set at a slight angle to the horizontal so that articles pass over the conveyor by gravity. In the case of the rollers 14 on the shafts 12, it is obvious that any article such as a bag or case of merchandise will pass forwardly over the conveyor. The diverter of the present invention comprises a plurality of shafts 16, 18, 20, 22 and 24, each of which has a plurality of rollers 26 attached thereto by means hereinafter described. The shafts 16 through 24 are mounted for rotation on the framework 28 of the conveyor and are provided with a crank mechanism 30 so that all of them can be rotated through a limited angle simultaneously.

Figure 2:
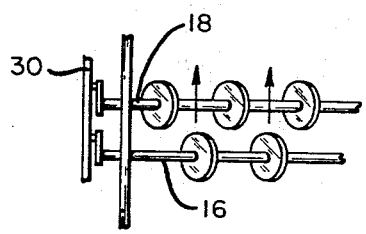
FIGURE 2 is a fragmentary view of a conveyor showing the parts in the position assumed when articles pass straight ahead over the diverter.
Figure 3:
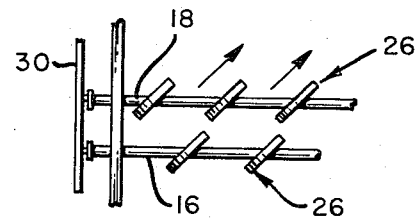
FIGURE 3 is a view similar to FIGURE 2 showing the carrier shafts turned whereby articles passing over the conveyor are diverted.
Figure 4:
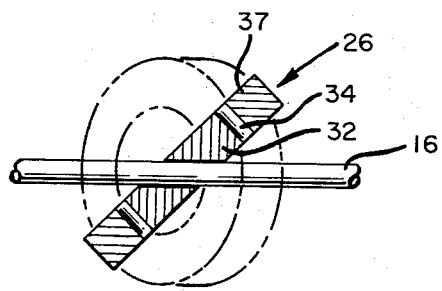
FIGURE 4 is an enlarged view of a roller on a shaft illustrating the principle of operation of the invention.

Each of the rollers is skewed with respect to the shaft on which it is mounted and this is shown in detail in FIGURE 4. Here member 32 serves not only as a hub, being rigidly attached to the shaft 16, but also serves as the inner race for roller bearings 34. The outer race and load bearing member is designated 37. In this case, the hub 32 has been drilled at an angle and fastened to the shaft 16 although other mounting methods can be employed as is hereinafter set forth in detail. The optimum mounting angle for maximum diversion is about 45°, although smaller angles can be employed. As is shown in FIGURE 4, shaft 16 can be turned to two positions one of which is that shown in sectional view of the roller and the other being that shown in dot dash lines. The method by which the diversion is achieved is shown in FIGURES 2 and 3. In FIGURE 2 the shafts 16 and 18 have been turned in such a manner that the upper or load bearing surfaces of the rollers lie in a straight direction with respect to the normal line of travel of articles on the conveyor. Thus when the shafts 16 and 18 are in position shown in FIGURE 2 articles passing over the conveyor will not be diverted but will continue over the straight section of the conveyor, i.e. that formed by shafts 36 and succeeding sections of the conveyor. Now if the shafts 16 and 18 are rotated by means 30 to approximately 90° to the position shown in FIGURE 3, the upper or load bearing surfaces of the rollers will not form a straight path but rather will form a path to the right. In this position, any load passing over the conveyor will be diverted to the side path provided by shafts 38, 40 and succeeding shafts. Thus by this simple rotation of the shafts 16 through 24 a diverting action is produced.

Figure 5:
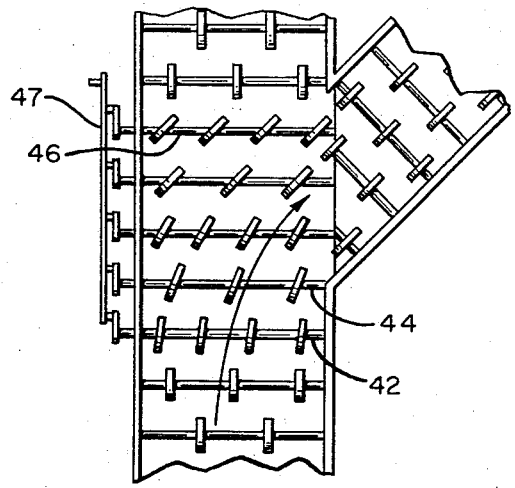
FIGURES 5 illustrates another embodiment of the invention wherein succeeding rows of rollers are turned to different degrees, causing a gradual turning movement of articles on the conveyor.

In the above example, it was assumed that the rollers on all of the shafts were set at the same angle. However, as is shown in FIGURE 5, it is ofen advantageous to have the angle changed gradually from one row of rollers to the next successive row. There are two ways of accomplishing this which are illustrated in FIGURE 5. As can be seen from the figure, the rollers on shaft 42 are set at a relatively slight angle, those on shaft 44 at a steeper angle and so on until shaft 46 has the rollers set at about the maximum usable angle i.e. about 45°. Thus as a package comes down such a conveyor, it does not encounter an abrupt change in direction but rather first encounters a gradual movement to the side which is increased as it proceeds down the conveyor, resulting in a gentle turning action. Instead of having the rollers on successive shafts set at different angles, all of the rollers can be set at the same angle and successive shafts can be given different degrees of rotation by linkage 47 to achieve the same end.

Figure 6:
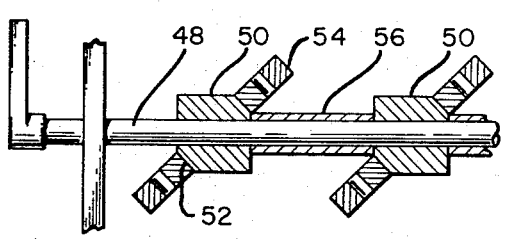
FIGURE 6 is an alternate means of mounting the rollers on a shaft.

In FIGURES 6 through 9 various alternate methods are shown of securing the rollers to the shaft or other carrying member. In FIGURE 6 shaft 48 is provided with a series of blocks 50 which have surfaces 52 turned thereon, said surfaces 52 being of suitable diameter to accommodate a standard roller 54. Spacer elements 56 can be employed between the blocks 50.

Figure 7:
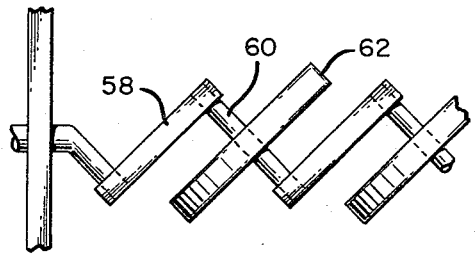
FIGURE 7 shows the rollers mounted on a built-up plurality of crank members.

In FIGURE 7 another method of construction is shown wherein a series of cranks made up of the elements 58 and 60 are employed, the elements 60 being of a suitable size to accommodate standard rollers 62.

Figure 8:
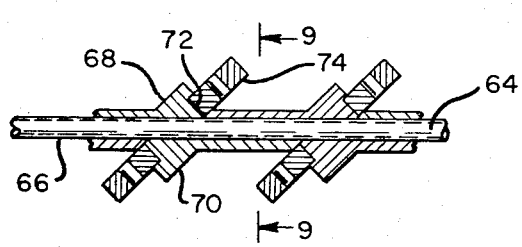
FIGURE 8 shows another method of mounting the rollers wherein keying elements are used.
Figure 9:
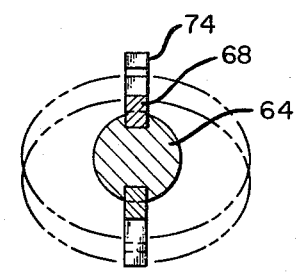
FIGURE 9 is an enlarged section on the line 9—9 of FIGURE 8.

In FIGURES 8 and 9 another scheme is shown wherein shaft 64 has keyways 66 cut therein with keys 68 and 70 fitting into the keyways. The keys have suitable surfaces 72 formed thereon to hold standard rollers 74.

In the structure shown in FIGURE 4, it is necessary to employ rollers having specially fabricated hubs 32 while in the systems shown in FIGURES 7 through 9, the carrying member itself is modified so that standard stock rollers can be employed.

Many departures can be made from the exact structures shown without departing from the spirit of this invention.

I claim:

1. In a conveyor of the type wherein a plurality of rollers form a path over which cases or bags of merchandise pass, the improvement comprising:
    (a) a carrying member extending across the path of travel substantially at right angles thereto;
    (b) a plurality of rollers on said carrying member, each of said rollers being mounted for independent rotation thereon;
    (c) each of said rollers having its axis of rotation angularly offset by an equal amount with respect to said carrying member and
    (d) means for rotating said carrying member through a limited angle.

2. The structure of claim 1 wherein the carrying member comprises a shaft with the rollers having hubs with angularly formed holes fitting on said shaft.

3. The structure of claim 1 wherein the carrying member comprises a plurality of cranks.

4. The structure of claim 1 wherein the carrying member comprises a shaft carrying at least one key, said key having a series of angular steps thereon supporting said rollers.

5. The structure of claim 1 wherein a plurality of parallel carrying members are employed, with means for rotating said members together.

6. The structure of claim 5 wherein a variable linkage is employed whereby upstream carrying members are turned less than succeeding carrying members, imparting a gentle turning movement to articles passing over the conveyor.

References Cited

UNITED STATES PATENTS

| 1,123,851 | 1/1915 | Cooper | 193—37 |
| 2,985,274 | 5/1961 | Byrnes et al. | 193—36 |
| 3,254,752 | 6/1966 | Bauch et al. | 193—36 |

ANDRES H. NIELSEN, *Primary Examiner.*

UNITED STATES PATENT OFFICE

CERTIFICATE OF CORRECTION

Patent No. 3,370,685            February 27, 1968

Joe D. Guilie

It is hereby certified that error appears in the above numbered patent requiring correction and that the said Letters Patent should read as corrected below.

In the heading to the printed specification, lines 3 and 4, for "assignor to Score Industries" read -- assignor to Icore Industries --.

Signed and sealed this 6th day of May 1969.

SEAL)

Attest:

Edward M. Fletcher, Jr.

Attesting Officer

Commissioner of Patents